United States Patent [19]

Paice

[11] Patent Number: 4,876,634
[45] Date of Patent: Oct. 24, 1989

[54] MULTI-PULSE CONVERTER SYSTEM

[75] Inventor: Derek A. Paice, Palm Harbor, Fla.

[73] Assignee: Westinghouse Electric Corp., Pittsburgh, Pa.

[21] Appl. No.: 214,080

[22] Filed: Jul. 1, 1988

[51] Int. Cl.$^4$ ............................................... H02M 7/00
[52] U.S. Cl. ............................................ 363/5; 363/64; 363/126
[58] Field of Search .................... 363/1, 2, 5, 45, 125, 363/126, 128, 129, 64; 318/177

[56] References Cited

U.S. PATENT DOCUMENTS

| | | | |
|---|---|---|---|
| 3,628,123 | 12/1971 | Rosa | 363/64 X |
| 4,366,532 | 12/1982 | Rosa et al. | 363/45 X |
| 4,482,945 | 11/1984 | Wolf et al. | 363/129 |
| 4,698,739 | 10/1987 | Paice | 363/64 X |

FOREIGN PATENT DOCUMENTS

| | | | |
|---|---|---|---|
| 0395952 | 1/1974 | U.S.S.R. | 363/2 |
| 1156216 | 5/1985 | U.S.S.R. | 363/126 |

OTHER PUBLICATIONS

Kreft et al., "Analysis of the Twelve-Pulse Rectifying Circuit", Iskra Technical Reports, (Oct.-Dec. 1978), pp. 225-229.

Primary Examiner—Patrick R. Salce
Assistant Examiner—Kristine Peckman
Attorney, Agent, or Firm—C. M. Lorin

[57] ABSTRACT

In a multiphase AC/DC converter system a single transformer is used having phase shifted tappings drawn from a polygonal succession of long and short windings wherein some of the windings carry only the difference between the outputted currents derived from the tappings.

13 Claims, 9 Drawing Sheets

TO BR#1 / TO BR#2

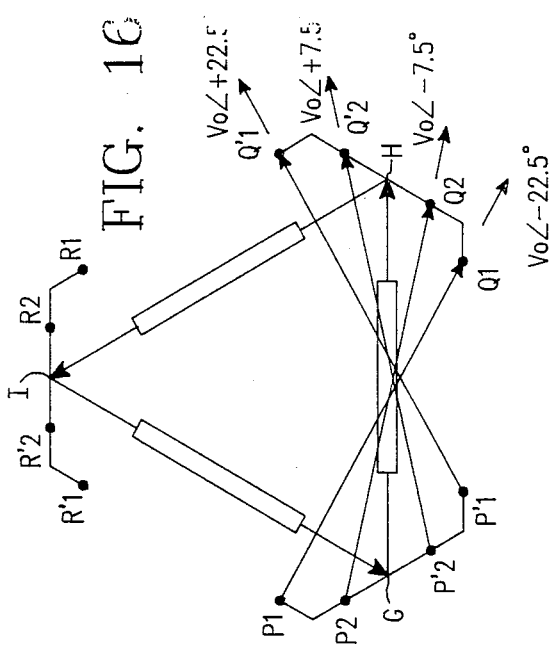
FIG. 16
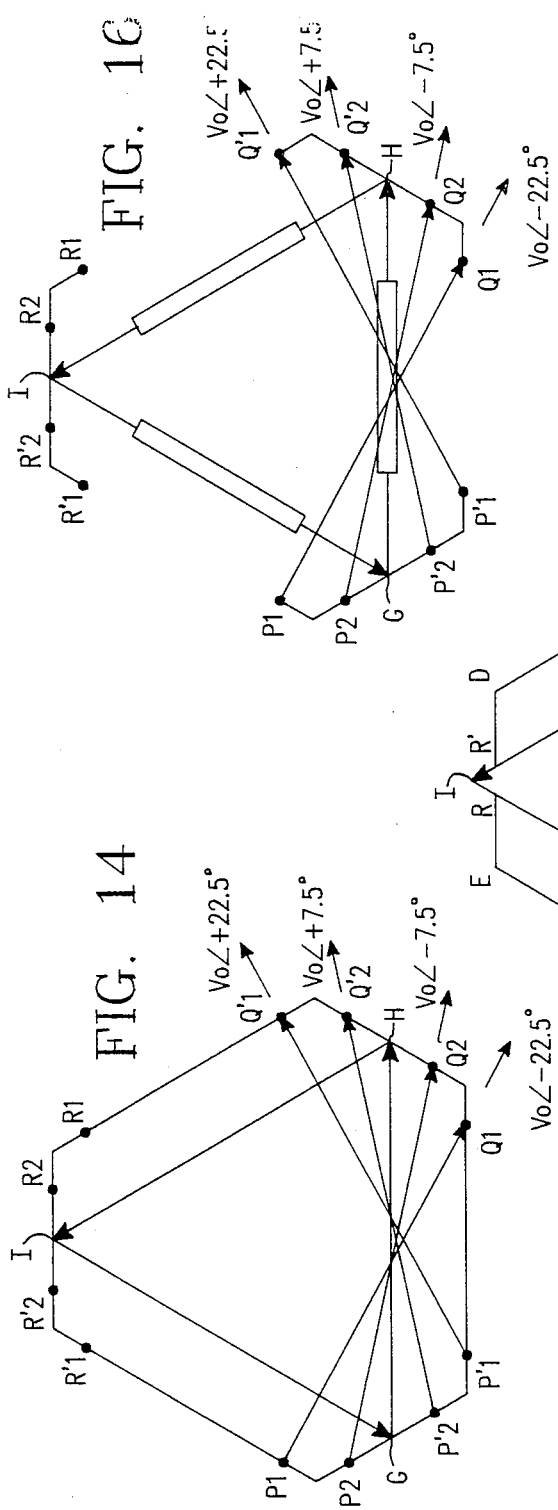
FIG. 15
FIG. 14

MULTI-PULSE CONVERTER SYSTEM

BACKGROUND OF THE INVENTION

The invention relates to static AC-to-DC converters such as can be used for AC or DC motor drives. The problem encountered with AC/DC converters is the generation of harmonics to the AC side caused by the rectification process. The need for reduction of AC line current harmonics drawn by the converter has become increasingly important, especially for applications incorporating emergency power sources, using diesel generators, since these have a relatively high impedance. In order to reduce the effect of harmonics, the most favorable prior art has used transformers having polygonal transformer connections combined with bridges of static switches operating on the respective phases and controlled so as to form a series of current pulses approximating the desirable sinusoidal waveform. See for instance Johannes Schaefer, Rectifier Circuits: Theory and Design/John Wiley & Sons, 1965. Increasing the pulse number and multiplying the number of phases on the AC side will improve the quality of the generated AC current. However, this is at the expense of using more transformers and of providing phase shifting transformers, a drawback, especially in lower power systems. More specifically, reference is made to U.S. Pat. Nos. 4,255,784 and 4,683,527 of John Rosa relating to a 12-pulse AC/DC converter of the hexagon type, one with two transformers, the other with a single transformer.

The object of the present invention is to use the polygon transformer technique of the prior art in such a way that the number of pulses is increased without having to increase the number of transformers to be used, while providing transformers of lower rating.

SUMMARY OF THE INVENTION

The invention from one aspect thereof, resides in providing harmonic reduction with two transformers defining a polygon for generating at least eighteen-pulses in an AC to DC converter system.

From a second aspect of the present invention, a twelve-pulse converter system is established by forming a polygon connection with a single transformer having a secondary combining three successive pairs of a long and a short winding, the three-phase input voltage being applied to tappings equally distributed among the three short windings of the secondary. Two rectifier bridges are associated with the junction points between long and short windings. The arrangement establishes an autotransformer relationship with the combinations of short and long windings connected to support the total applied voltage.

More specifically, the short winding taps are midtaps and three dual phase shift autotransformers are formed disposed at 30 degrees to one another and +15 degrees to the input voltage in a delta fashion, each autotransformer including a central long winding sided by two respective half short windings at 120 degrees thereto. With this connection, the current in the long winding is the difference between the currents in the short windings and as such, the winding current rating is very favorably reduced. In a conventional polygon implementation, such dual autotransformers are coupled to one another between opposite short and long windings. In either case, a connection to a corresponding phase of the associated rectifier bridge is provided from the junction between consecutive long and half short windings, and the ampere-turns are equal on each winding. Two static switch rectifier bridges are associated, one in the even succession, the other in the odd succession of the apeces with such connections between long and half short windings.

In accordance with a further embodiment of the invention, an eighteen-pulse AC/DC converter is formed by adding a third rectifier bridge connected to the input voltage at the midtaps of the short windings, respectively.

The gist of the present invention resides, with a multiple pulse converter installation, in forming on the windings of a single transformer phase shifted tappings which define a regularly distributed plurality of three-phase output sets. Such sets of outputs may be chosen to establish a 12-pulse, an 18-pulse, or a 24-pulse AC/DC converter system. Typically, a 24-pulse converter is implemented with a single transformer with four sets of outputs.

A common feature of the single transformer used according to the present invention is that, with its tappings, it operates as an autotransformer, and that some of the windings carry only the difference between the output currents derived from the tappings, whereby only a small fraction of the total output is involved and the rating of the transformer is minimized.

BRIEF DESCRIPTION OF THE DRAWINGS

FIGS. 14 and 16 are polygonal representations of generalizations to illustrate 24-pulse AC/DC converters derived from the 18-pulse single autotransformer of FIG. 6;

FIG. 15 is illustrative of another approach under the diagram of FIG. 6 to obtaining a 1:1 ratio.

DETAILED DESCRIPTION OF THE INVENTION

Figure 1:
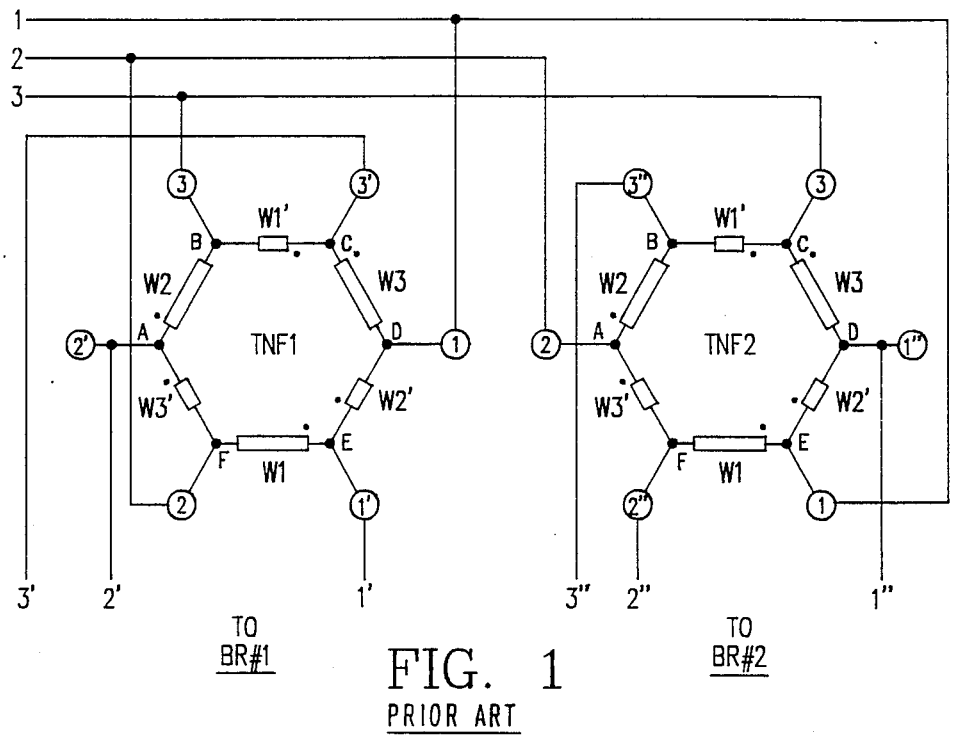
FIG. 1 shows a 12-pulse AC/DC converter system of the prior art using two transformers.

Referring to FIG. 1, there is shown a 12-pulse converter of the prior art. The prior art is disclosed on pages 68-72 of the afore-stated 1965 book of J. Schaefer, which is hereby incorporated by reference. Typically, two six-pulse rectifier systems are used which are built around respective polygon phase shifting transformers TNF1 and TNF2 having their secondaries connected to two rectifier bridges (BR#1 and BR#2), respectively. The phase shift between the two bridges is 30 degrees. Each transformer includes opposite short (W') and long (W) windings (which in a double-wound setting are magnetically coupled to one another) distributed radially in accordance with the respcetive three phases 1, 2, 3 of the primary power supply. With the same polygonal distribution ABCDEF of windings clockwise W2, W1', W3, W2', W1, W3', one polygon has the input voltage applied from supply lines 1,2,3 to EAC, the other to DFB, the other apeces being connected to the corresponding bridge (1', 2', 3' for bridge BR#1, 1", 2", 3" for bridge #2). Long winding W1 is coupled to short winding W1', similarly W2 to W'2 and W3 to W'3, in each transformer (TNF1 and TNF2). The connecting lines to the corresponding bridge are 1' to bridge BR#1 from E, while line 1 goes to D in TNF1, whereas 1' to bridge BR#2 comes from D in TNF2 when line 1 goes to E. Similarly, 2' to bridge BR#1 comes from A and line 2 goes to F in TNF1, whereas 2" to bridge BR#2 comes from F and line 2 goes to A. Line 3 and lines 3', 3" do the same with respect to apeces B and C, and to C and B, respectively. The angle $\phi$ determining the phase shift is given by the turn ratio between the long and the short windings. Toward the DC side, as generally known, balancing transformers are provided on each of the lines going to the bridges, and the bridges have in common the DC link (terminals TP and TN). Filtering capacitor and resistor and the usual inductor are inserted between the DC terminals.

Figure 2:
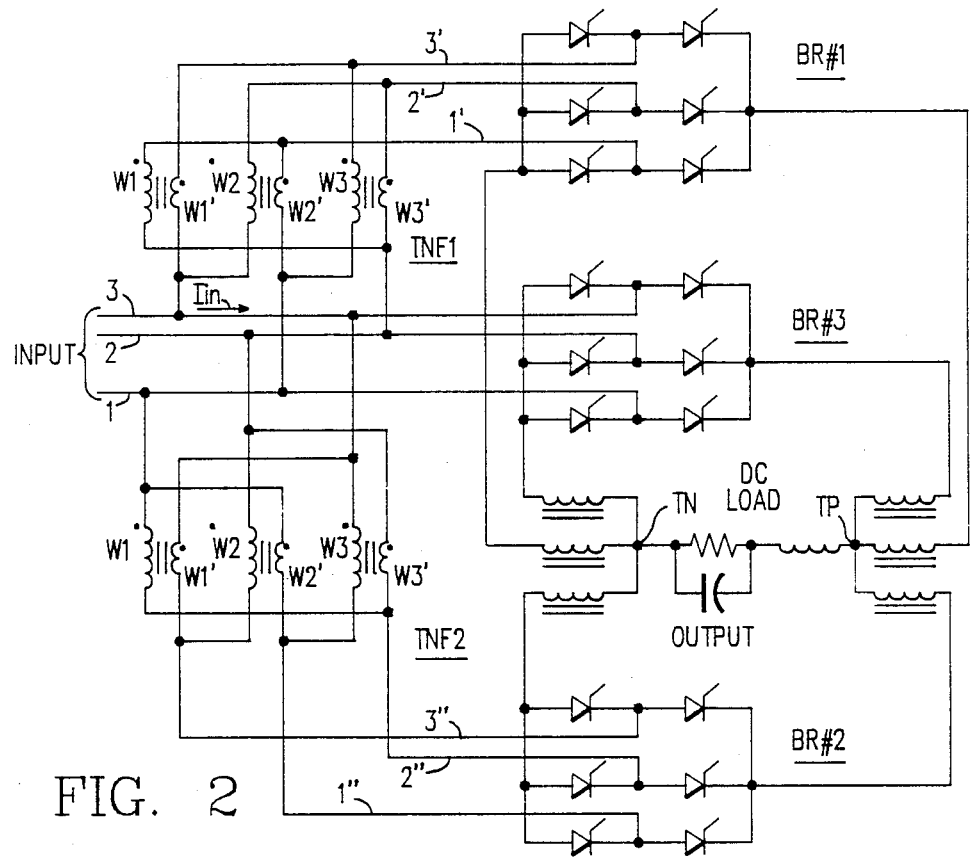
FIG. 2 is a diagram of a 18-pulse AC/DC converter system according to the present invention, derived from the converter system of FIG. 1 with two transformers and an additional rectifier bridge.

Referring to FIG. 2, the AC/DC converter system of FIG. 1 is shown with its two bridges BR#1 and BR#2 and the DC terminals TP, TN. In addition, according to the present invention, the system of FIG. 1 has been improved by adding a third bridge BR#3 so as to form a 18-pulse system without having to increase the number of transformers. In this fashion, the advantages of a 18-pulse system over a 12-pulse system are obtained and this is accomplished with two transformers, each having a rating of only 10.3% of the total output. As shown in FIG. 2, the three primary phases 1, 2, 3 are connected to the respective apeces of the polygon, namely: at the junction of W3, W2' for phase line 1, of W1, W3' for phase line 2 and of W2, W1' for phase line 3 in transformer TNF1 and at the junction of W1, W2' for phase line 1, of W2, W3' for phase line 2 and of W3, W1' for phase line 3 in transformer TNF2. From such respective junctions between a primary phase and an apex of the polygons are derived three input lines (1, 2, 3) for a third bridge BR#3 used in common for the two transformers. This third bridge BR#3 is associated with the DC terminals TP (positive polarity) and TN (negative polarity) to create more pulses in the current configuration of the input concurrently with the two other bridges BR#1 and BR#2 which relate, separately, to a corresponding one of the two transformers TNF1 and TNF2.

Figure 3A:
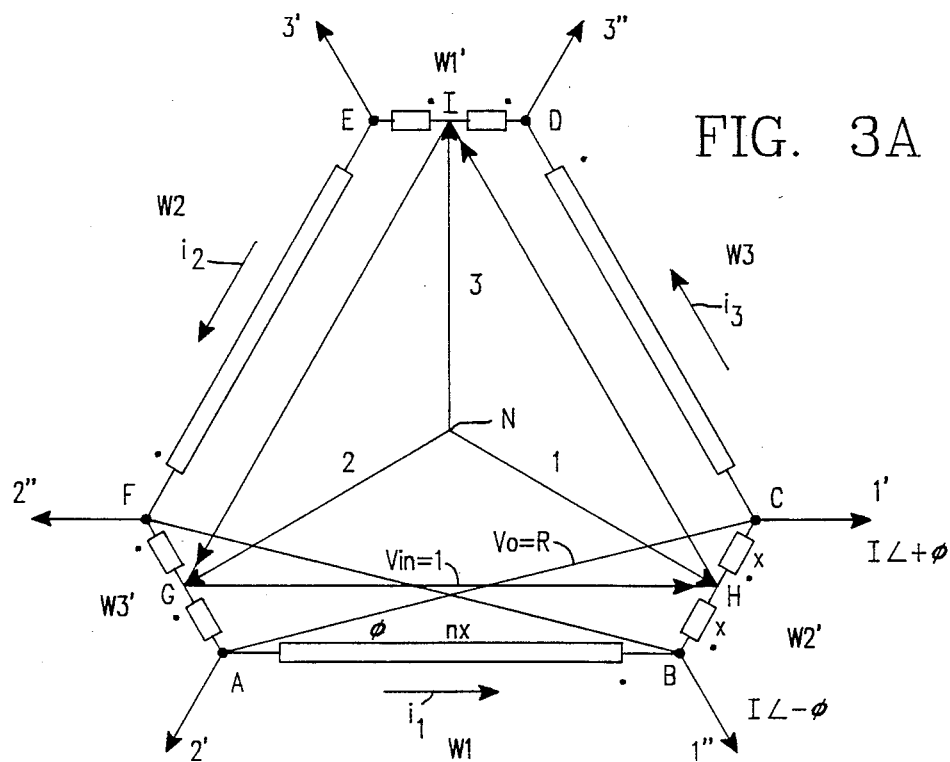
FIG. 3A illustrates winding turns and tappings, voltage and current relationship between windings in a single transformer with differential ampere-turns as used for a 12-pulse AC/DC converter system according to the present invention.

Referring to FIG. 3A, there is shown a 12-pulse polygonal AC/DC converter system based, as explained hereinafter, on the concept of a dual phase shift auto transformer, so as to achieve a 12-pulse system requiring only one transformer. The essence of the invention resides in providing a center tap within each of the short windings on the polygon so as to produce, at each point, equal but opposite phase shifts for the adjoining output voltages, as well as outgoing currents of equal magnitude but opposite phase shifts.

Instead of building a 12-pulse system with two six-pulse rectifier systems shifted at 30 degrees (namely two polygons, each with one rectifier bridge, each polygon consisting of three pairs of consecutive long and a short windings distributed radially at 120 degrees to one another in accordance with the delta vectorial spatial disposition of the three phase power supply), it is now proposed to provide a single polygon transformer having taps defining, in association to the two rectifier bridges, equilateral triangles symmetrically disposed (at 15° opposite directions) relative to the centrally disposed triangle corresponding to the input power supply at the primary. In other words, the two transformers of FIG. 1 have been replaced by two autotransformers symmetrically and oppositely disposed in relation to the primary input phases and electrically combined within the single polygon defined by the common succession of long and short windings. Accordingly, reference will be made hereinafter to a dual phase shift autotransformer when referring to the main embodiment of the invention. This will appear more clearly from the following description of FIGS. 3A, 3B and 3C.

As shown in FIG. 3A, assuming the input amplitude to be unity, the voltage across a long winding is nx, and the voltage across a short winding is 2x. Actually, the short winding consists of two windings of voltage x separated by a midtap. The result is hexagon having six apeces A–F carrying outputting lines (1', 2', 3' at C, A, E, for bridge BR#1; 1", 2", 3" at B, F, D for bridge BR#2) and a three-phase input defined with three phases of the power supply applied to the midtaps H, G, I (phase lines 1, 2, 3, respectively) of the short windings (W2', W3' and W1', respectively). Considering the apeces A, B, C, D, E, F defining the long windings (W1 carrying a current i1 between A and B; W2 carrying a current i2 between E and F; and W3 carrying a current i3 between C and D), apeces B, F and D are connected by respective lines 1", 2", 3" to a second rectifier bridge BR#2, whereas C, A and E are connected by lines 1', 2' and 3', respectively, to a first bridge BR#1.

Figure 3B:
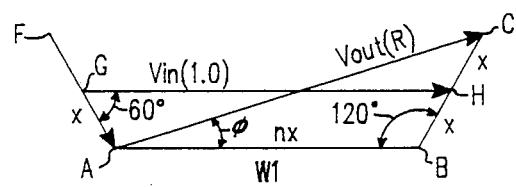
FIG. 3B is a vectorial representation of the voltages involved in the dual phase shift autotransformer of the diagram of FIG. 3A.

As shown vectorially on FIG. 3B for phase 1, the primary or input voltage is between H and G whereas the output voltage (the ratio Vout/Vin=R is given by Vout=R, if the input voltage Vin is assumed to be unity) is between C and A. It appears that the relation between nx and x determines the phase shift $\phi$, while the output voltage R depends upon n and the phase shift $\phi$. There is a 60° angle between AG and GH, and a 120° between AB and BC. This leads to the following mathematical formulation:

Triangle ABC of FIG. 3B leads to:

$$\frac{2x}{\sin \phi} = \frac{nx}{\sin (60 - \phi)} \quad (1)$$

Therefore, $$n = 2 \frac{\sin (60 - \phi)}{\sin \phi}$$

whereas, parallelogram GABH, under the assumption that Vin=1, leads to:

$$x \cos \phi + nx + x \cos 60 = 1$$

Accordingly:

$$x = 1/(1+n) = \sin \phi/(\sin + 2 \sin (60-\phi)) \quad (1)$$

and $$Vo/Vin = R = \sqrt{3x}/\sin \phi = 1/\cos \phi \quad (3)$$

Equations (1), (2) and (3) define n, x, and R.

By selecting values for $\phi$ while solving as to Vo/Vin, the following Table I can be established:

TABLE I

|  | 7.5° | 15° | 20° | 22.5° |
|---|---|---|---|---|
| R = Vo/Vin | 1.008 | 1.035 | 1.064 | 1.082 |

Table I shows that the output voltage is slightly higher than the input voltage. This, however, can be compensated for, as will be explained hereinafter.

Figure 4:
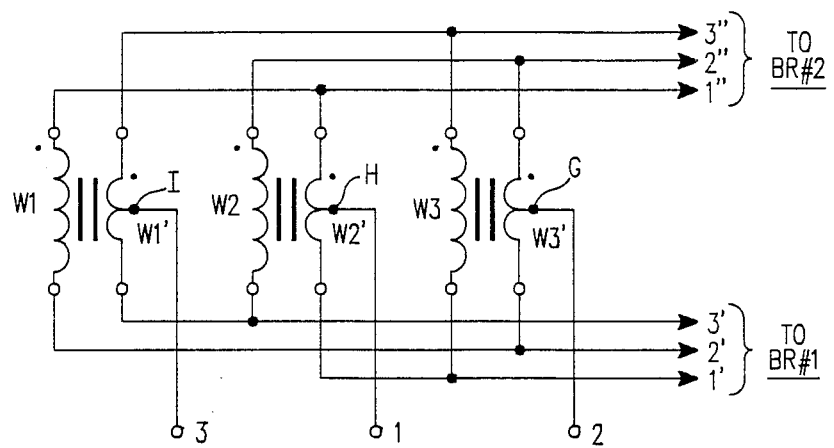
FIG. 4 shows a 12-pulse AC/DC converter system of the double phase shift type obtained with the single transformer approach of FIGS. 3A, 3B and 3C.

Referring to FIG. 4, which shows a double-wound transformer, it is observed that, as in the afore-stated J. Rosa Pat. No. 4,255,784, a transformer here combines successive windings which are coupled magnetically by pairs across opposite sides of the hexagon, thus, each long winding is magnetically coupled to the short winding of the opposite side. This embodiment of the invention is shown in FIG. 4 for W1,W1'; W2,W2' and W3,W3', where W1', W2' and W3' are the short windings of 2x turns, thus formed about the midtap (I for W1' going to phase line 3; H for W2' going to phase line 1 and G for W3' going to phase line 2) by two windings of x turns. The latter are magnetically coupled to a corresponding long winding W1, W2, or W3, each of $nx$ turns, as earlier stated.

In contrast to the conventional double-wound transformer implementation as in the afore-stated J. Rosa patent, the single transformer of FIG. 3A and FIG. 4 is conceived more truly as having electrical connections between the related windings, in the manner of an auto transformer. In this respect, it is noticed that, while there is a central delta GHI at the primary, at the secondary there are two symmetrically disposed delta connections to the respective bridges BR#1 and BR#2. These are defined by triangles EAC and DFB. These triangles are shifted relative to the central triangle to an extent governed by x turns of the half short winding and in opposite directions. This internal organization is what has been defined as forming a "dual phase shift autotransformer" with differential current balance.

Figure 3C:
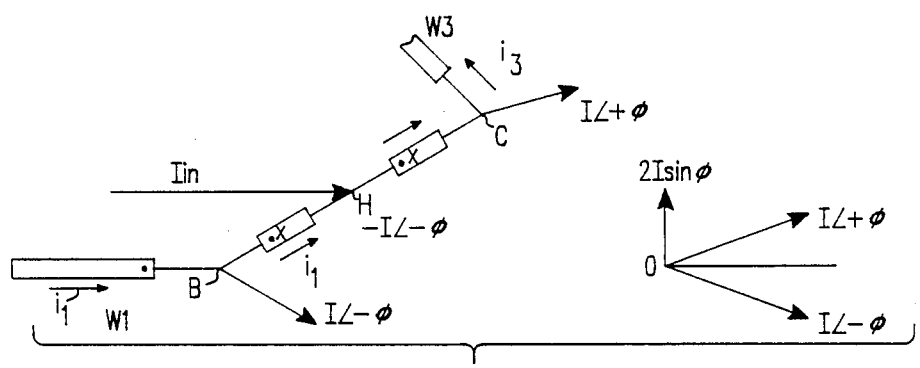
FIG. 3C is a vectorial representation of the currents involved in the context of FIG. 4B.

Referring to FIG. 3C illustrating the distribution of currents (relating to vectorial representation of FIG. 3B involving HG for the primary, where HG is the input voltage Vin and CA the output voltage Vout or R, under the assumption that Vin=1), the total ampere turns on the limbs (current i1 flowing in AB, i2 in EF and i3 in CD) must amount to zero. Considering long winding EF (W2 and current i2) and the opposite short winding (W2') along BC, the ampere turns rule leads to:

$$x[i_1 - I\angle - \phi] + \chi[i_3 + I\angle + \phi] = i_2 n \chi$$

since $i_1+i_2+i_3=0$, it follows that $i_1+i_3=-i_2$, or, $-i_2\chi-I\chi-\phi+I\chi+\phi=i_2n\chi$, and, $i_2\chi(1+n)=\chi[I+\phi-I-\phi]$. Therefore, $i_2\chi(1+n)=2jI\sin \phi$ and, $$\left|\frac{i_2}{I}\right| = \frac{2 \sin \phi}{(1 + n)} \quad (4)$$

Consequently, the current in the short winding is given by:

$$\left|\frac{i_2}{I}\right| = \text{secant } \phi \sqrt{1 + sn^2 \left( \cos \phi - \frac{\sin \phi}{3} \right)^2} \quad (5)$$

It appears that the input current Iin, when reaching junction H at the midtap of winding W2', distributes itself between current $I_1-I\angle-\phi$ on line 1" from apex B and current $I_3+I\angle+\phi$ on line 1' from apex C, these two currents being of opposite phase to one another. Therefore, winding W2' carries on one half thereof $(i_3+I\angle+\phi)$, whereas on the other half there flows $(i_1-I\angle-\phi)$. As a result, the short winding carries a current which is only as shown by equation (5), namely the difference between the outputted currents of the two lines 1' and 1" in the case of winding W2'. The long windings carry only the difference of currents in the short windings. Thus, the overall rating of the single transformer used according to the present invention, considering the overall polygon, is much reduced.

Referring again to the transformer of FIG. 4, the rating of this transformer can be calculated based on the data of Table II, as follows:

TABLE II

| Phase Shift | n | Long WDG Current $i_2/I$ | (R) VO/Vin | Total Short Voltage /Vo | Total Long Voltage /Vo | WDG Short | VA/Vo I Long | Total 3WDG's VA/VoI |
|---|---|---|---|---|---|---|---|---|
| ±15° | 5.464 | 0.08 | 1.035 | 0.298 | 0.814 | 0.315 | 0.065 | 1.140 |
| ±20° | 3.758 | 0.143 | 1.064 | 0.395 | 0.742 | 0.433 | 0.106 | 1.617 | where VA is the product of the voltage by the amperes in the winding, Vo is the output voltage, and I the current in the phase line to the DC terminals. The last column results of Table II can be compared with the total VA winding rating for a normal transformer which would have a rating per unit of $2\times2\sqrt{3}$. Therefore, for $\pm15°$ the ratio of the dual phase shift polygon transformer rating to the total power output is:

$$1.140/2\times2\sqrt{3}=0.164.$$

For $\pm20°$ it would be: $1.617/2\times2\sqrt{3}=0.233$.

Accordingly, for the situation of FIG. 4, a 12 pulse converter scheme is achieved providing a 3.5% increase in the output voltage, with a rating equal to only 16.4% that obtained with a conventional double-wound transformer approach.

Figure 5:
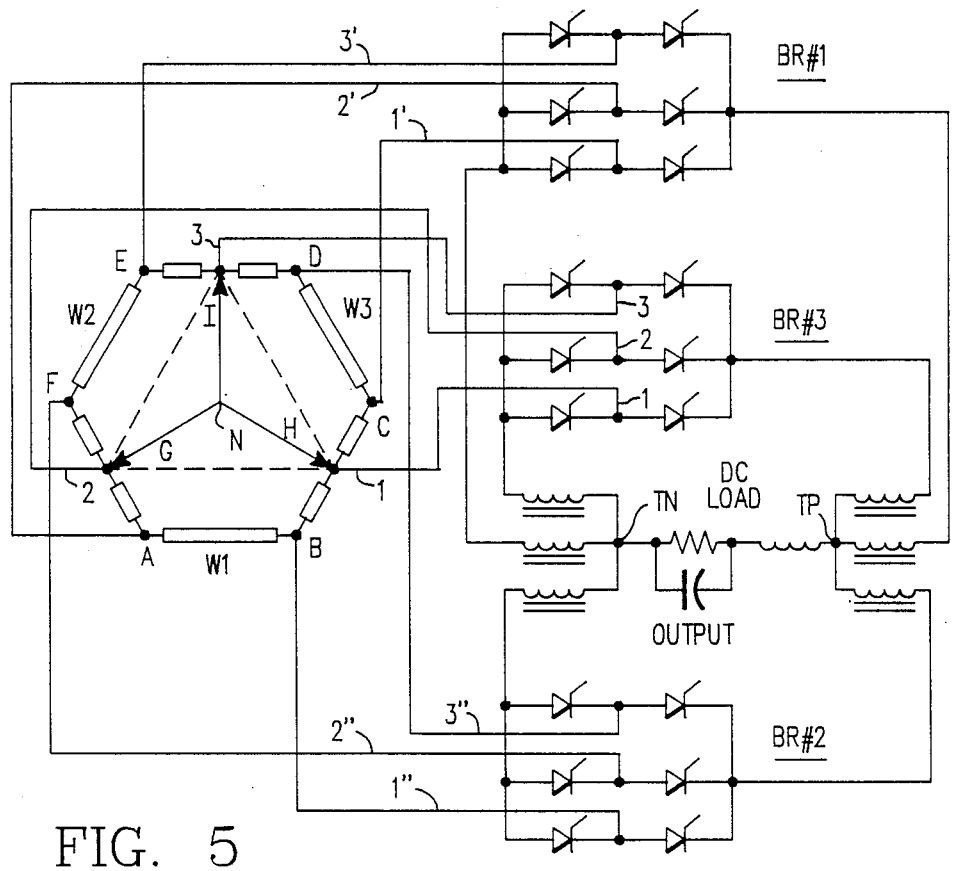
FIG. 5 illustrates an 18-pulse AC/DC system using the dual phase shift autotransformer according to FIGS. 3A to 3C.
Figure 6:
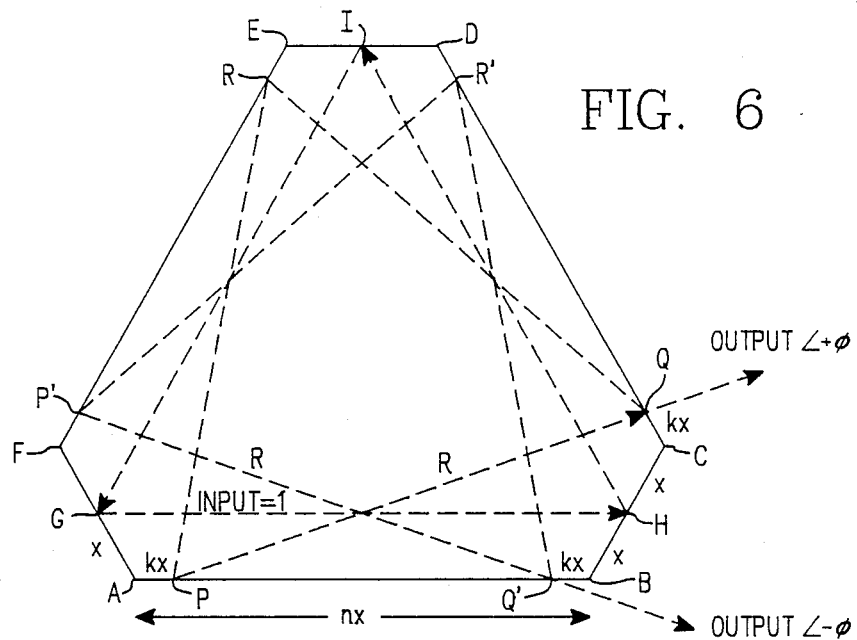
FIG. 6 illustrates possible changes in the short windings and/or in the tap positions for the transformer of FIG. 3A in order to modify the ratio between output and input voltage.

FIG. 5 shows the transformer of FIG. 3A used for a 18-pulse system. Three bridges are used as in the example of FIG. 2. In this case, for bridge BR#3 an increase of the output voltage by about 6.4% is required, by boosting the supply fed, in order to balance out with the two other bridges. This appears from the fact that H, G, I of the central triangle are radially closer to the virtual ground than A, B, ... F. It is now proposed to compensate for this by displacing, as shown in FIG. 6, the tapping points E, A, C toward R, P, Q, on one side and tapping points D, F, B toward R', P' and Q', on the other tube so that the new tapping points be at equal distance to the virtual ground as H, G, I. In other words, the object is to compensate for the higher output voltage relative to the input voltage, so as to obtain a 1:1 voltage ratio.

Referring to FIG. 6, instead of two triangles shifted symmetrically at ACE and DFB from the central triangle GHI, two triangles are established PQR and P'Q'R' away from the hexagon apeces A-F by an amount kx as shown clockwise from the apeces for one triangle, and counterclockwise for the other. At these points (P,Q,R) and (P',Q',R') are drawn the connecting lines to the rectifier bridges (BR#1 and BR#2 of FIG. 2, respectively).

Figure 7:
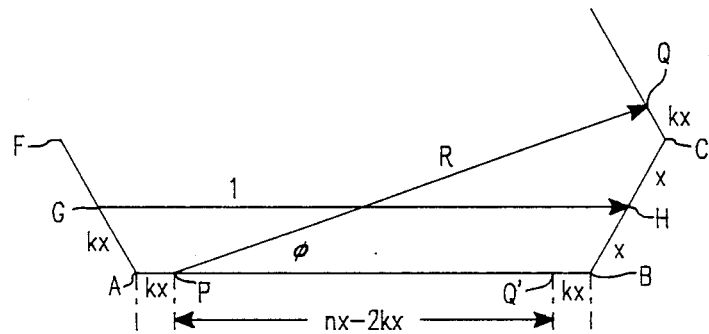
FIG. 7 is a vector diagram showing how a modified tapping according to FIG. 6 will affect the output to input voltage ratio.

Referring to FIG. 7, it is shown by a vector diagram that the voltage ratio is modified to the extent of the new tappings of line 2' shifted from A to P, of line 1' shifted from C to Q (as well as of line 3' shifted from E to R) for triangle ACE, a combined effect being obtained from triangles FBD and P'Q'R', as shown in FIG. 7 by point Q' away by kx from apex B. The phase shift angle is between PQ and PB. There is a 60° angle between QQ' and Q'B, and (60 $-\phi$) between PQ and QQ'. On the other hand, $PQ'=nx-2kx$, and $PQ-R$ (the output voltage), whereas $Vin=GH$ (the input voltage).

With these data, $$\frac{R}{\sin 120}=\frac{(nx-2kx)}{\sin(60-\phi)} \quad (5)$$

Therefore, $$R=\frac{\sqrt{3}}{2}\times\frac{(n-2k)}{\sin(60-\phi)}$$

From the parallelogram GHBA it follows that:

$$\chi\cos 60+n\chi+\chi\cos 60=1$$

or, $$\chi(1+n)=1 \quad (6)$$

QQ' is equal to $2x+2kx\cos 60=2x(1+k\cos 60)$. Also, triangle PQQ' yields the following:

$$2x\frac{(1+\cos 60)}{\sin\phi}=\frac{nx-2kx}{\sin(60-\phi)}=\frac{x(n-2k)}{\sin(60-\phi)} \quad (7)$$

Accordingly:

$$2\frac{(1+\cos 60)}{\sin\phi}=\frac{(n-2k)}{\sin(60-\phi)}$$

If a ratio 1:1 is intended, R will be unity and the three equations to be solved become:

$$1=\frac{\sqrt{3}}{2}\times\frac{(n-2k)}{\sin(60-\phi)} \quad (5A)$$

$$n=\left(\frac{1}{x}-1\right) \quad (6A)$$

$$2\frac{(1+k\cos 60)}{\sin\phi}=\frac{(n-2k)}{\sin(60-\phi)} \quad (7A)$$

from which x and k are derived as follows:

$$x=\frac{2}{3\sqrt{3}}[\sin(60-\phi)+2\sin\phi]-\frac{1}{3} \quad (8)$$

$$k=\frac{n\sin\phi-2\sin(60-\phi)}{\sin(60-\phi)+2\sin\phi} \quad (9)$$

Having found x from equation (8), n from equation (6A) and k from equation (9), the currents are calculated.

Figure 8:
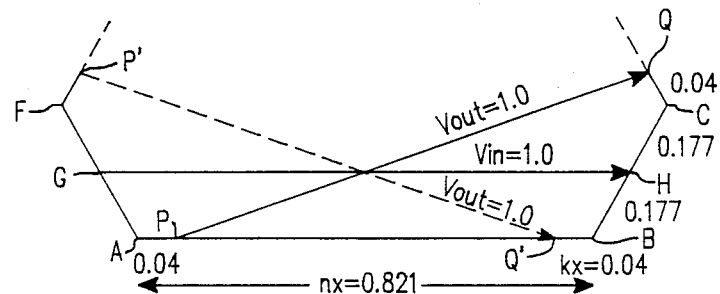
FIG. 8 is like FIG. 7, but illustrative of a one-to-one output to input ratio.

Illustratively, for $\phi=20°$ and Vo/Vin=1, the solutions are:

$$n=4.638;\ k=0.2266;\ \text{and}\ x=0.177$$

the vector diagram for this condition being as shown in FIG. 8, where $AP=Q'B=QC=P'F=kx=0.04$; and $AB=nx=0.821$, based on $GH=1$.

Figure 9:
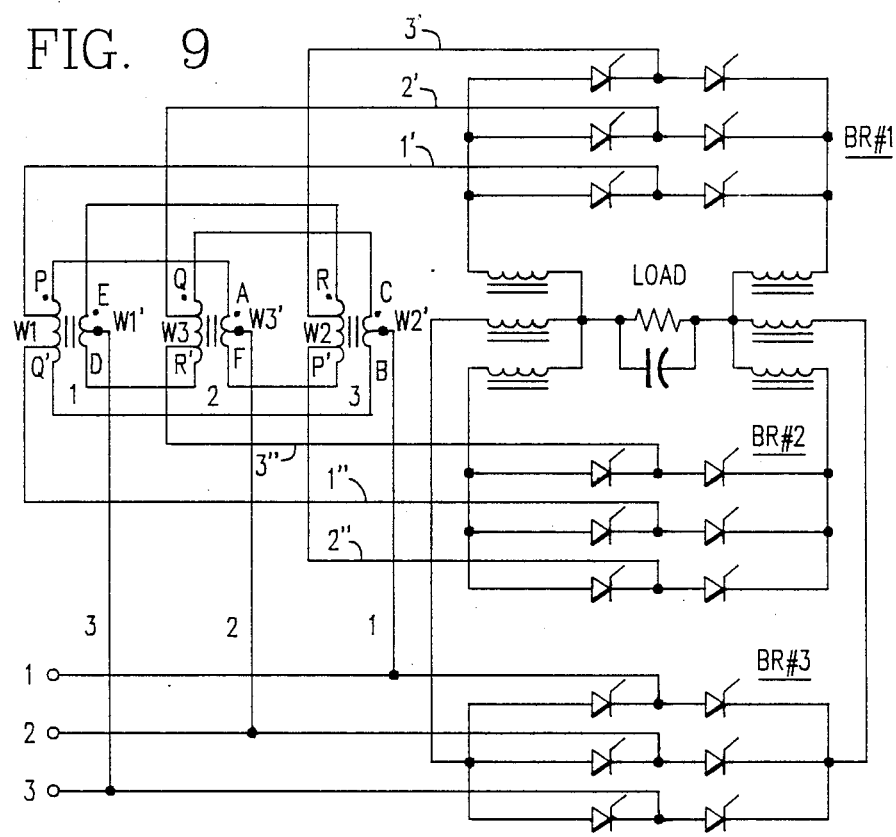
FIG. 9 is a diagram showing an 18-pulse converter arrangement using the dual phase shift autotransformer according to the present invention in the case of a 1:1 voltage ratio.

FIG. 9 shows a dual phase shift autotransformer for an 18-pulse system designed according to FIG. 7 for a unity voltage ratio. The equivalent double wound transformer is rated at about 15% of the total output of DC power.

Figure 10:
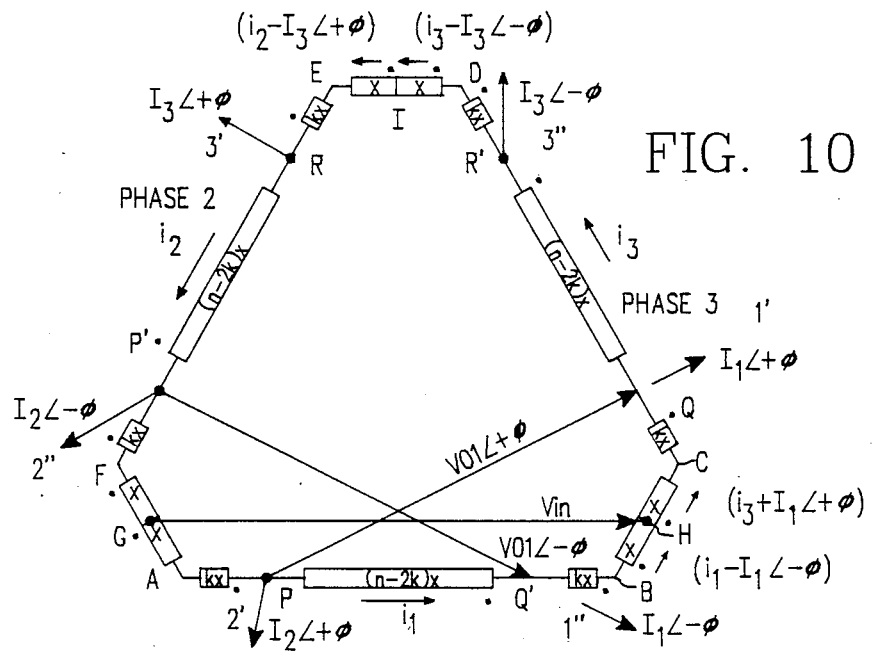
FIG. 10 is a polygonal representation, like under FIG. 3A, illustrating the manner in which currents can be calculated.

Referring to FIG. 10, the hexagon of FIG. 6 is represented with the branching of the various currents: $i_1$ in winding W1, $i_2$ in Winding W2 and $i_3$ in winding W3; $I1\angle+\phi$ in line 1' from tapping Q; $I1\angle-\phi$ in line 1" from tapping Q'; $I2\angle+\phi$ in line 2' from tapping P; $I2\angle-\phi$ in line 3" from tapping P'; $I3+\phi$ in line 3' from tapping R; $I3\angle-\phi$ in line 2" from tapping R'. The values of n, k, and x are chosen so that FIG. 10 shows a 1:1 dual polygon. Considering the ampere-turn balance on phase #2, the following obtains:

$$(i_3+I1\angle+\phi)\chi+(i_1-I1\angle-\phi)\chi-(i_2+I3\angle+\phi)kx-\\-i_2(n-2k)\chi-(i_2-I2\angle-\phi)kx=0$$

Therefore:

$$i_2=[I1\angle+\phi-I1\angle-\phi-kI3\angle+\phi-\\+kI2\angle-\phi]/(1+n) \quad (1)$$

By permutation around the polygon, $i_1$ and $i_3$ are deduced as follows:

$$i_1 = [I3\angle+\phi - I3\angle-\phi - kI2\angle+\phi + kI1\angle-\phi]/(1+n) \quad (2)$$

$$i_3 = [I2\angle+\phi - I2\angle-\phi - kI1\angle+\phi + kI3\angle-\phi]/(1+n) \quad (3)$$

These three equations yield the plotted output waveshapes. The latter can also be derived from the analytic solutions thereof.

For the purpose of illustration, the system of FIG. 10 will now be assumed to be for a 18-pulse system, which means that lines 1, 2 and 3 are tapped on peaks I, G and H of the primary triangle, and connected to a third bridge like BR#3 in FIGS. 2 and 9. The total input current for such a system will comprise a current $I\angle O$ plus the transformer input current $I_{1T}$ where:

$$I_{1T} = I1\angle+\phi + I1\angle-\phi + (i_3 - i_1)$$

using equations (1), (2) and (3) hereabove, it follows:

$$I_{1T} = I1\angle+\phi + I1\angle-\phi - \frac{kI1\angle-\phi}{1+n} - \frac{kI1\angle+\phi}{1+n} +$$

$$\frac{I2\angle+\phi}{1+n} - \frac{I2\angle-\phi}{1+n} + \frac{kI2\angle+\phi}{1+n} +$$

$$\frac{kI3\angle-\phi}{1+n} - \frac{I3\angle+\phi}{1+n} + \frac{I3\angle-\phi}{1+n}$$

Thus, the total input current $I_{1L}$ drawn from the phase 1 supply is:

$$I_{1L} = I1\angle O + I1\angle+\phi\left(1 - \frac{k}{1+n}\right) +$$

$$I1\angle-100\left(1 - \frac{k}{1+n}\right) +$$

$$\frac{I2\angle+\phi}{1+n}(1+k) - \frac{I2\angle-\phi}{1+n} +$$

$$\frac{I3\angle-\phi}{1+n}(1+k) - \frac{I3\angle+\phi}{1+n}$$

(These equations are also valid for $k=0$).

Assuming $\phi=20°$; $x=0.177$; $k=0.2266$; $n=4.638$, the current will be:

$$I_{1L} = I1\angle O + 0.9598\ I1\angle+\phi + 0.9598\ I1\angle-\phi +$$

$$0.2175\ I2\angle+\phi - 0.177\ I2\angle-\phi +$$

$$0.2175\ I3\angle-\phi - 0.177\ I3\angle+\phi$$

Figure 11:
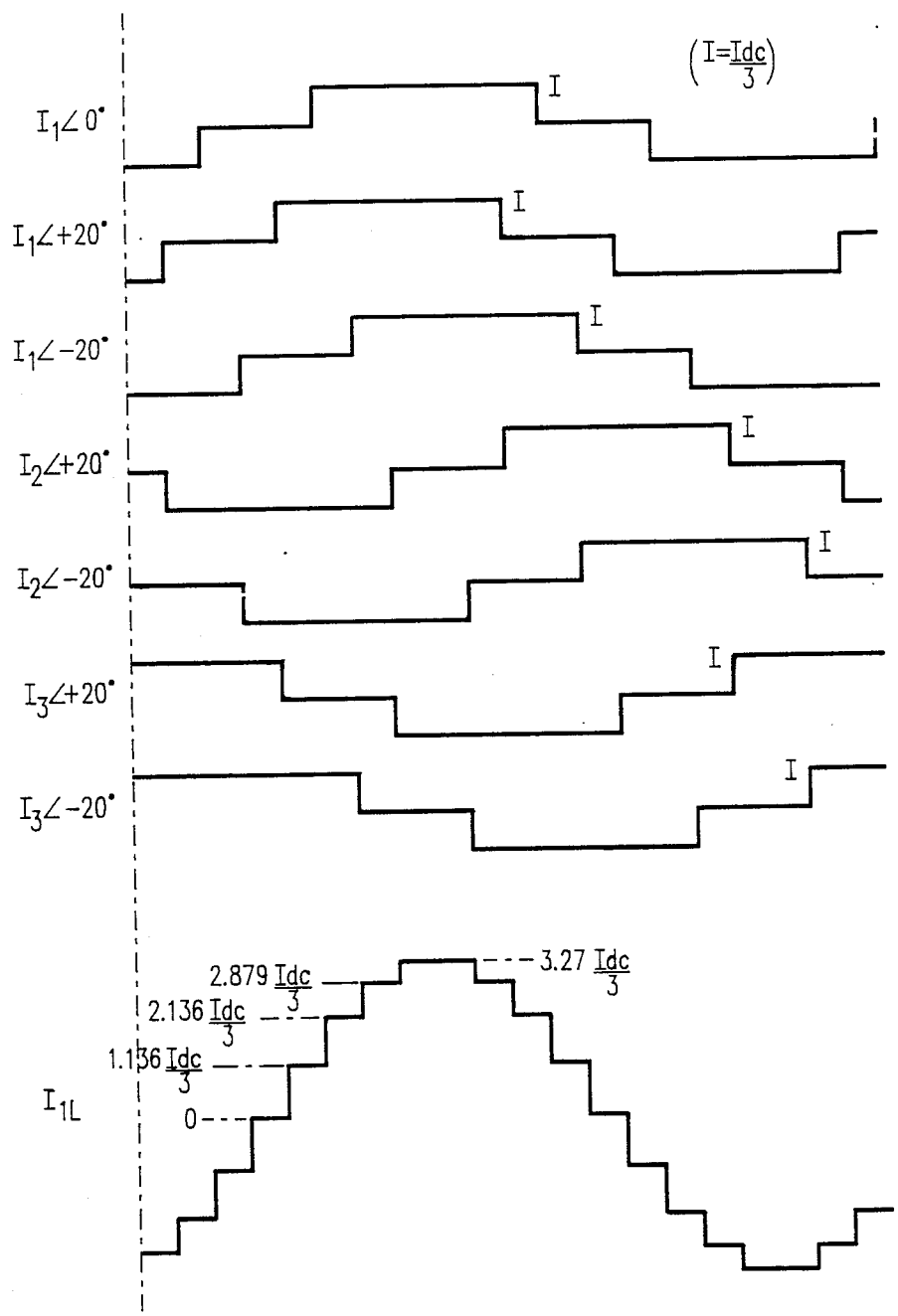
FIG. 11 shows the line currents drawn by a 18-pulse converter supplied from a dual polygon with ±20° phase shift and an additional direct connection.

The total line current I is plotted (in accordance with $I1\angle 0$; $I1\angle-20$; $I1\angle+20$; $I2\angle-20$; $I2\angle+20$; $I3\angle-20$ and $I3\angle+20$) in FIG. 11 showing a typical 18-pulse current with harmonics of the form (18 $k\pm1$).

Figure 12:
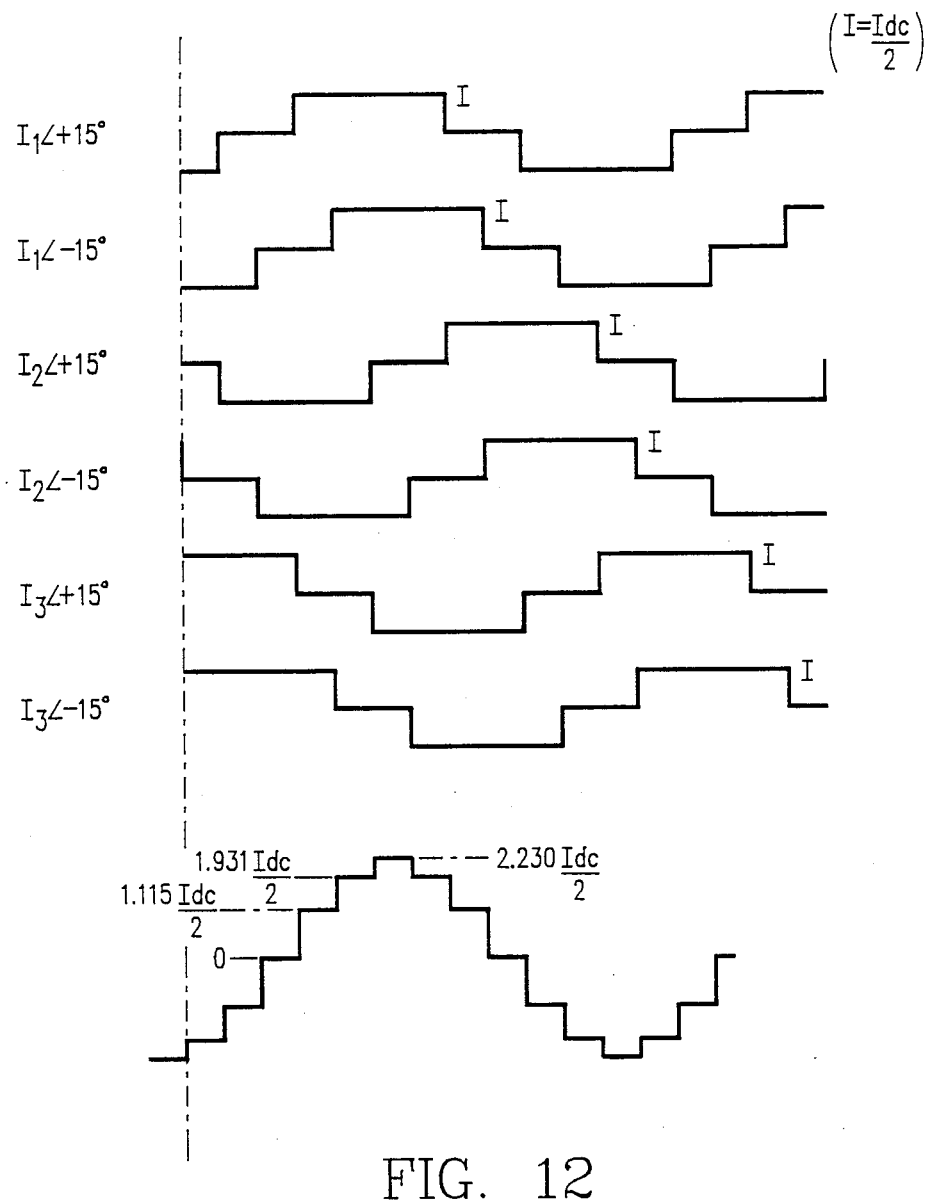
FIG. 12 illustrates the line currents for a 12-pulse arrangement of a 1:1 dual polygon transformer of phase shift $\phi = 15°$.

In a similar manner the currents $I1\angle+15$; $I1\angle-15$; $I2\angle+15$; $I2\angle-15$; $I3\angle+15$ and $I3\angle-15$ are shown in FIG. 12 for a 1:1 dual polygon used in a 12-pulse system with harmonics of the form (12 $k\pm1$) resulting in a line current $I_{1L}$, as plotted, which is equal to: $I_{1L}=0.97728$ $I1\angle+\phi+0.97728\ I1\angle-\phi+0.16078\ I2\angle+\phi-0.13807$ $I2\angle-\phi+0.16078\ I3\angle-\phi-0.13807\ I3+\phi$.

Figure 13:
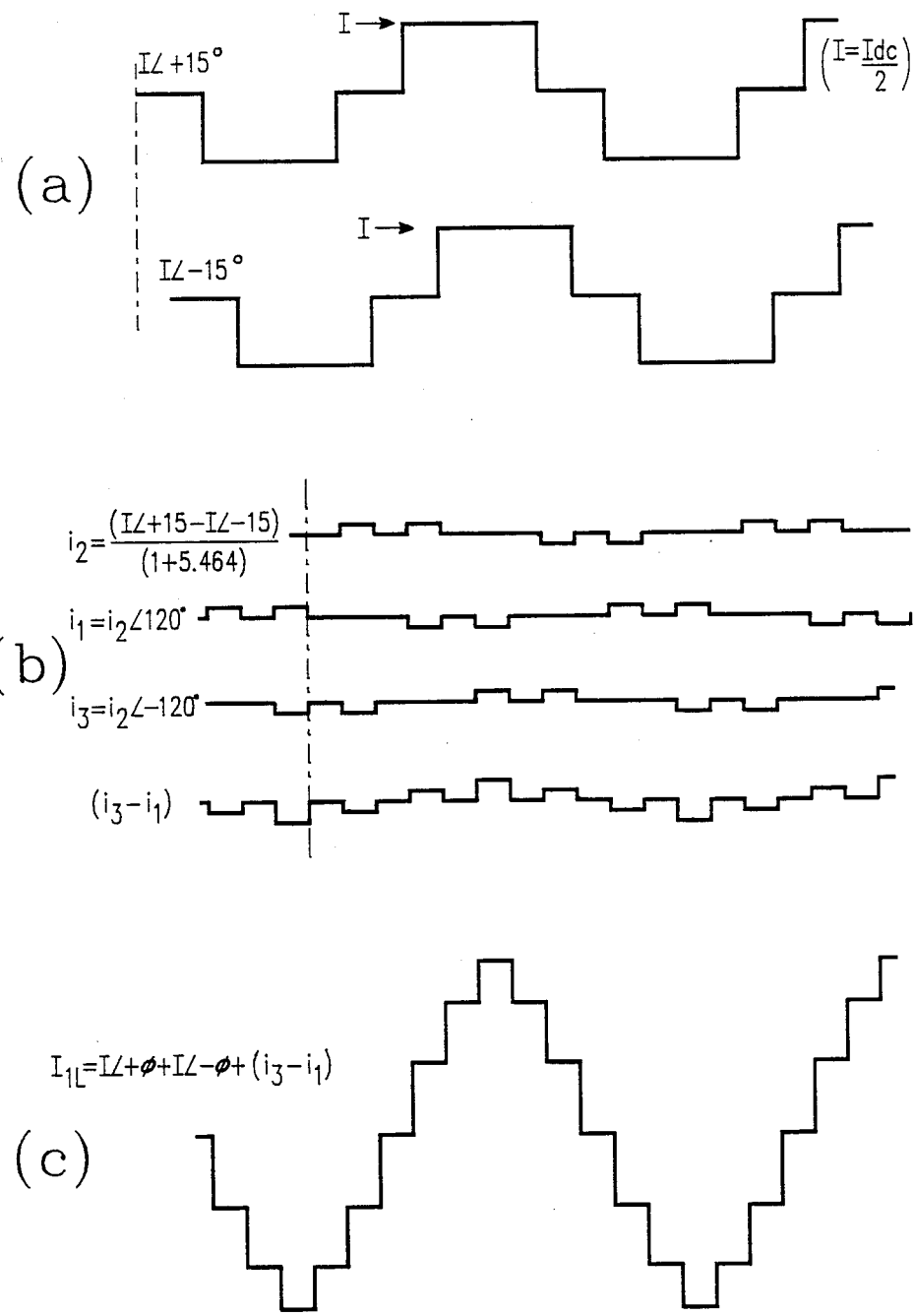
FIGS. 13A, B and C show the line currents in the case of a 12-pulse dual polygon transformer where the phase shift $\phi = 15°$ and where the output to input voltage ratio is 1.035:1, and the connections are like in the diagram of FIG. 4.

FIG. 13 is illustrative of a 12-pulse system where the voltage ratio is 1.035:1, like in the example of FIG. 5. Currents $I\angle+15$ and $I\angle--$ are represented under (a) typifying I1, I2, I3. FIG. 13 also shows under (b)

$$i_1 = i_2\angle+120 \text{ and } i_3 = i_2\angle-120.$$

In addition, $I_{1L}$ is plotted under (c), where:

$$I_{1L} = I\angle+\phi + I\angle-\phi + (i_3 - i_1)$$

FIG. 14 relates to a 24-pulse system obtained with the hexagon of FIG. 10 by associating with the central triangle (input voltages) two pairs of triangles symmetrically disposed about the central triangle. Thus, triangle P1Q1R1 matches its opposite P1'Q1'R1', while triangle P2Q2R2 matches P2'Q2'R2', the phase shifts being for the output voltages Vo $-22.5°$ (at Q1); $-7.5°$ (at Q2), $+7.5°$ (at Q2') and $+22.5°$ (at Q1').

FIG. 15 shows phase shifts built-up by windings Q'H and HQ outside the overall winding BC so as to obtain a vectorial length GH for the input voltage Vin equal to the output voltage vectorial length FB. Similarly, short windings P'G and GP are built around external apex G and between windings FP' and PA along the shorter side FA of the polygon. In the same way, short windings R'I and IR are added around apex I in relation to windings DR' and RE for the shorter side DE. Therefore, FIG. 15 illustrates another way of attaining a 1:1 ratio between Vin and Vout.

FIG. 16 shows another embodiment of the invention wherein each short winding midtap of FIG. 3A is now a common connection for two long windings as well. The long windings have been placed in delta-connection between the three midtaps, thus forming an equilateral triangle therebetween. FIG. 16 also illustrates the two half-windings on opposite sides of a midtap as being built in the fashion of FIG. 14 so as to provide a 24-pulse system with output lines drawn from tappings P1, P2, and P'2, P'1 for midtap G; from tappings Q1, Q2 and Q'2, Q'1 for midtap H; from R1, R2 and R'2, R'1 for midtap I. Thus, the long winding W1 supports the full line voltage, with the associated output voltages being across P1Q1, P2Q2, P'1Q'1 and P'2, Q'2, and the same being done for the two other long windings, W2 and W3. A 24-pulse converter system is obtained, and it is a matter of choice in the light of the embodiments previously described, to select variations therefrom. For instance, the long winding triangle of FIG. 15 may also be inscribed away from the midtap positions, and a 1:1 ratio may be achieved by proper adjustment of the inclinations of the lines joining opposite output tappings. The last mentioned embodiment of the invention may be described as a differential delta auto-connected transformer.

I claim:

1. A multiple AC/DC converter system comprising:
   a regular polygon connected transformer having at least six successive windings defining successive tappings therebetween which constitute secondary tappings of the transformer;
   alternate ones of said windings each having a midpoint tapping;
   a three-phase primary power supply being supplied to said midpoint tappings which constitute primary tappings of the transformer;

said secondary tappings being respectively connected to six pairs of static-controlled rectifiers, each of said pairs being serially mounted across opposite polarity DC terminals;

wherein said secondary tappings belong to two sets of three tappings symmetrically disposed about said primary tappings, one set being oriented clockwise, the other set being oriented counterclockwise relative thereto;

whereby a voltage phase shift of predetermined magnitude relative to the voltage applied by the power supply is provided by three pairs of static-controlled rectifiers connected to said primary tappings, such phase shift being one polarity for one of said two sets of secondary tappings and opposite in polarity for the other of said two sets of secondary tappings.

2. The system of claim 1 with the polygon transformer comprising three identical pairs of windings one long and one short symmetrically disposed to form a hexagon of alternatively one short and one long side in succession;

with said one set of three secondary tappings forming within said hexagon one triangle having each side extending from the end of one short winding to the end of the next short winding following clockwise; and with said other set of three secondary tappings forming another triangle having a disposition within the hexagon which is similar to said one triangle but relative to a next short winding following counterclockwise.

3. The system of claim 2 with each long winding being coupled magnetically to the short winding of the opposite side of the hexagon.

4. The system of claim 2 with said primary tappings being midtaps on a short winding.

5. The system of claim 2 with said long windings being connected in delta between said three primary tappings.

6. The system of claim 5 with said three primary tappings being at midtaps of the respective said short windings.

7. The system of claim 6 with each of said short windings having a first and a second secondary tapping on either sides of the associated midtap, thereby to form a 24-pulse converter system.

8. The system of claim 1 with said one set of secondary tappings forming within the hexagon one triangle having each side extending from a point defined on one long winding by a predetermined number of ampere-turns of said one long winding to a point defined on the next long winding by the same said predetermined number of ampere-turns, said points being counted from the end of an adjoining short winding preceding clockwise;

with said other set of secondary tappings forming another triangle disposed similarly within the hexagon, said predetermined number of ampere-turns being counted from the end of an adjoining short winding preceding counterclockwise.

9. The system of claim 8 with said primary tappings being midtaps on a short winding.

10. An auto transformer for an AC/DC converter comprising six windings regularly disposed along a polygon wherein each winding is alternatively a long and a short winding, and each long winding is equal to another long winding, each short winding is equal to another short winding, each short winding having a midtap and said midtaps forming a central equilateral triangle and being responsive to a three-phase input voltage; output tappings being provided at selected locations on each long winding to proivde at least one pair of equilateral triangles symmetrically disposed about said central triangle; output voltages being derived from said pair of triangles.

11. The transformer of claim 10 with a 12-pulse converter being associated with said output tappings.

12. The transformer of claim 10 with output voltages being derived from said midtaps, a 18-pulse converter being associated with said output tappings and said midtaps.

13. The transformer of claim 10 with additional locations being selected on eah long winding to provide two pairs of equilateral triangles symmetrically disposed about said triangle, and additional output tappings being derived from said additional locations, output voltages being derived from all of said tappings to provide a 24-pulse converter.

* * * * *